United States Patent
Congard et al.

(10) Patent No.: US 6,740,379 B1
(45) Date of Patent: May 25, 2004

(54) ADHESIVE TAPE FOR ADHERING INSERTS TO A PAGE OF A MAGAZINE

(75) Inventors: Pierre M. Congard, Sannois (FR); Richard Sabatier, Paris (FR); Jean-Phillippe Weber, Dachstein (FR)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/623,850

(22) PCT Filed: Mar. 4, 1999

(86) PCT No.: PCT/US99/04838

§ 371 (c)(1),
(2), (4) Date: Sep. 8, 2000

(87) PCT Pub. No.: WO99/46347

PCT Pub. Date: Sep. 16, 1999

(30) Foreign Application Priority Data

Mar. 13, 1998 (EP) ............................................. 98200803

(51) Int. Cl.$^7$ ............................. B32B 7/06; B32B 31/18
(52) U.S. Cl. .................... 428/42.2; 428/40.1; 428/40.2; 428/41.8; 428/343; 428/352; 428/914; 156/247; 156/248; 156/289; 156/306.3; 156/344
(58) Field of Search ............................... 428/40.1–42.3, 428/343, 355, 211, 352, 411.1, 212, 914; 156/247–249, 252–253, 268, 289, 306.3, 344, 233, 241, 277; 162/4; 525/479; 556/450; 528/10

(56) References Cited

U.S. PATENT DOCUMENTS

| 4,003,538 A | 1/1977 | Frye |
| 4,388,432 A | 6/1983 | Eskay |

(List continued on next page.)

FOREIGN PATENT DOCUMENTS

| EP | 414 538 A3 | 2/1991 |
| EP | 414 538 A2 | 2/1991 |
| EP | 618 509 B1 | 7/2000 |
| GB | 2 298 390 A | 9/1996 |
| WO | WO 98/21285 | 5/1998 |

OTHER PUBLICATIONS

Cosmetics and Toiletries Manufacture Worldwide, Aston Publishing Group, 1994.*
Cosmetics and Toiletries Manufacture Worldwide, 1994.*
Satas (ed.), Handbook of Pressure–Sensitive Adhesive Technology, "Acrylic Adhesives" 1989, pp. 396–456.
Buttery, "Encapsulation of Fragrances", Cosmetics and Toiletries Manufacture Worldwide, 1994, ISBN 0 9819830 2 4, 165, 166, 169–171.

*Primary Examiner*—Harold Pyon
*Assistant Examiner*—Brian P. Egan
(74) *Attorney, Agent, or Firm*—Carolyn V. Peters

(57) ABSTRACT

The present invention provides an adhesive tape for laminating a first substrate to a second substrate, wherein the adhesive tape includes a carrier having on a first major surface a first adhesive layer and having on a second major surface opposite to the first major surface in the order given a non-tacky polymer layer and a second adhesive layer, wherein the adhesive tape is capable of being adhered to the first substrate by the first adhesive layer and to the second substrate by the second adhesive layer. The adhesive tape is capable of delamination between the carrier and the non-tacky polymer layer when the first and second substrate are peeled away from each other so as to leave the carrier on the first substrate and the non-tacky polymer layer on the second substrate with a major surface of the non-tacky polymer layer or the carrier. The non-tacky polymer layer and carrier are not co-extruded layers.

The present invention further provides a method for manufacturing the adhesive tape and the use of the adhesive tape for placing inserts in a multi-page publication.

35 Claims, 3 Drawing Sheets

U.S. PATENT DOCUMENTS

| | | | |
|---|---|---|---|
| 4,398,985 A | * 8/1983 | Eagon | 156/233 |
| 4,413,080 A | 11/1983 | Blake | |
| 4,482,675 A | 11/1984 | Witt | |
| 4,568,403 A | * 2/1986 | Egan | 156/247 |
| 4,569,960 A | 2/1986 | Blake | |
| 4,708,907 A | * 11/1987 | Flutti et al. | 428/352 |
| 4,721,638 A | 1/1988 | Matsuguchi et al. | |
| 4,925,714 A | * 5/1990 | Freedman | 428/40 |
| 4,992,501 A | 2/1991 | Hanninen et al. | |
| 5,032,460 A | 7/1991 | Kantner et al. | |
| 5,037,703 A | * 8/1991 | Negi et al. | 428/475.2 |
| 5,102,733 A | * 4/1992 | Zawadzki | 428/343 |
| 5,125,995 A | 6/1992 | D'Haese et al. | |
| 5,130,185 A | * 7/1992 | Ness | 428/40 |
| 5,202,190 A | 4/1993 | Kantner et al. | |
| 5,380,779 A | 1/1995 | D'Haese | |
| 5,468,816 A | * 11/1995 | Hurford et al. | 525/479 |
| 6,451,398 B1 | * 9/2002 | Sylvester | 428/41.8 |

* cited by examiner

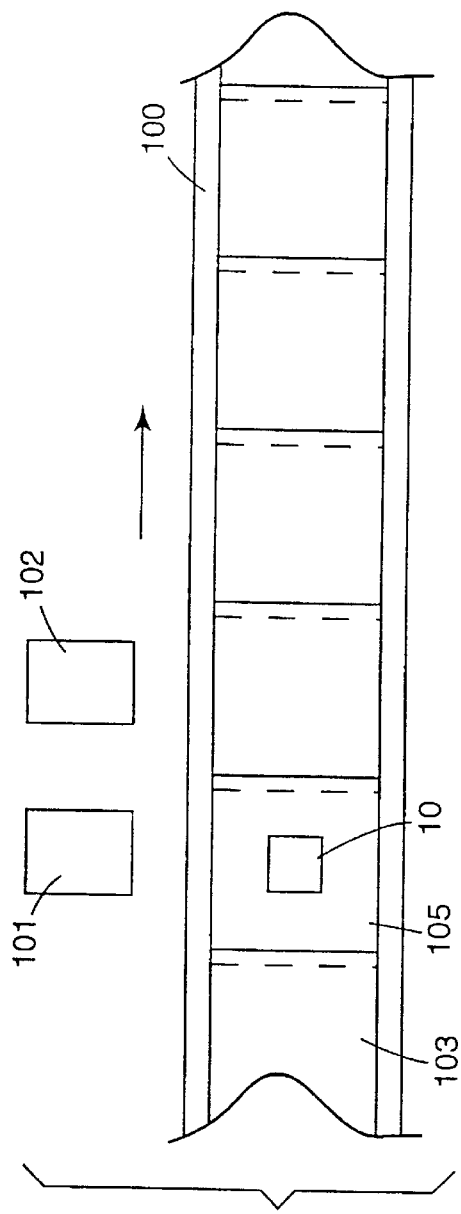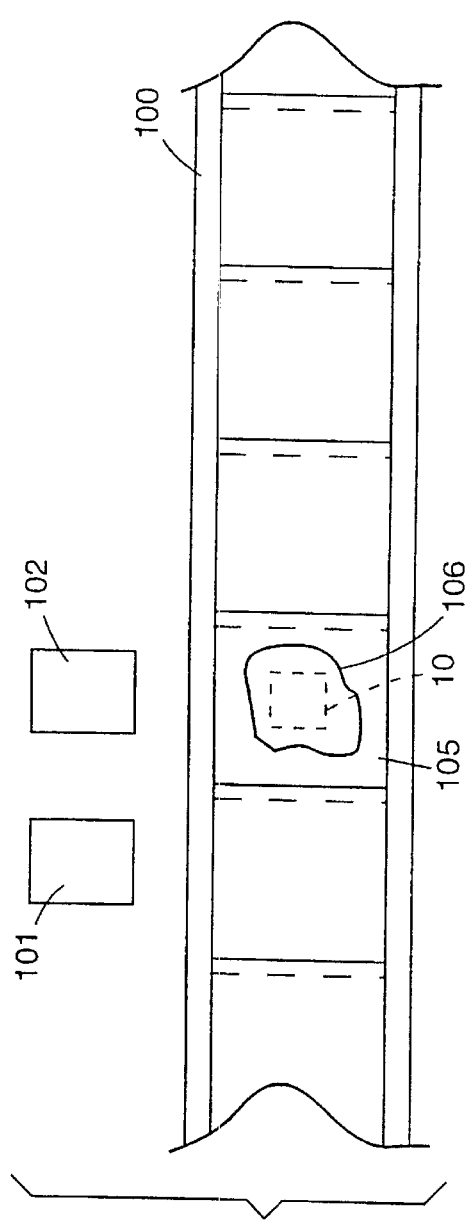

ADHESIVE TAPE FOR ADHERING INSERTS TO A PAGE OF A MAGAZINE

FIELD OF THE INVENTION

This invention relates to an adhesive tape that can be used to releasably adhere an insert to a page of a multi-page publication such as a newspaper or a magazine in such a way that when the insert is removed from the page of the printed publication, the surfaces of both the page and the insert are not tacky and the page does not get damaged by removing the insert.

BACKGROUND OF THE INVENTION

Inserts such as product samples and mail back cards are frequently inserted in newspapers or magazines. Such inserts can be inserted in a magazine by permanently adhering them to a page of the multi-page printed publication. However, this has the disadvantage that upon removing the insert from the multi-page printed publication, the page to which it was adhered may get damaged. It is also known to adhere the insert to a page of a magazine or newspaper by means of a repositionable adhesive. While this method does not create damage to the page to which the insert was adhered, either the page or the insert will contain adhesive and one of them will remain tacky.

Similarly, U.S. Pat. No. 4,398,985 describes that it is known to coat a face stock with a release material and this is then laminated, with the release coated side down, to a paper base which has been coated on both sides with pressure sensitive adhesive. The outer adhesive layer is then used to adhere the face stock to a substrate. Due to the release material, the face stock can be peeled away from the adhesive layer of the paper base and thus the face stock can be separated from the substrate. However, the substrate remaining will be tacky due to the adhesive remaining thereon. Accordingly, this type of construction is not suitable for placing inserts in a magazine or printed publication.

U.S. Pat. No. 4,398,985 attempts to solve this problem by providing a self-detackifying adhesive laminated construction. The laminated construction is produced by coating a film of a non-silicone containing polymer onto one side of a face stock and then laminating this construction to an adhesive which has been coated on a release liner. The polymer film and adhesive have differential release capabilities such that the polymer film will initially adhere to the face stock and the adhesive layer on the other side thereof, but upon delamination, the polymer film will have greater affinity for the adhesive layer. Accordingly, when the face stock is peeled away, the polymer film will delaminate therefrom and remain permanently affixed to the adhesive coating. This results in a non-tacky surface remaining because the remaining adhesive coating is covered by a non-tacky polymer. Also, the face stock will not be tacky.

While, the above method may be effective in placing inserts in magazines, it suffers from several disadvantages. Firstly, the method requires that the insert be coated on one side with a polymer film. This is not very practical in many instances. For example if the insert concerns a mail back card that is printed on one or both sides, after printing, the printer might have to send the mail back card to a specialised service for coating the mail back card and laminating it to the release liner with adhesive, because often printers do not have the necessary equipment. This makes the process cumbersome and costly. Moreover, in producing magazines, printers are often under serious time constraints which do not allow for the insert to be send to a specialised service to coat and laminate the insert. Also, depending on the kind of surface of the insert, for example paper or plastic, different polymer film coatings will be needed due to the required differential release capabilities.

EP 414 538 discloses a card that is adapted for removable attachment to a surface. The card comprises a card sheet having two opposite sides and a laminated sheet bonded to one side of the card sheet. The laminated sheet includes a plurality of overlying layers that are adapted to separate along an interface between two layers of thin film. The interface comprises a layer of adhesive. Accordingly, when the card sheet is removed by delamination at the interface, at least one of the remaining surfaces will contain the adhesive.

U.S. Pat. No. 4,721,638 discloses a sticking material for preventing resticking. The material has an adhesive layer, a second layer laminated on one main surface of the adhesive layer, a peeling agent layer laminated on the second layer and a first layer laminated on the peeling agent layer. The equation, a<b is satisfied, wherein the force required to separate the first layer from the second layer at the peeling agent layer is denoted as a, and the adhesive force of the adhesive layer with the surface of the second layer is represented by b. Since the second and first layers are adhered temporarily via the peeling agent layer, the first layer once separated from the second layer, cannot be restuck. While this material is useful for labels such as price tags, the material is however not suitable for placing inserts in a multi-page printed publication.

U.S. Pat. No. 4,925,714 discloses a co-extruded core laminate of polypropylene and polyethylene which has been provided on both sides with an adhesive layer. According to the teaching of this patent, such an adhesive tape can be used to adhere coupons, cards, tags or other cut-to-shape face pieces on substrates such as containers, wrappings and packages. The face piece can subsequently be peeled off in such a way that both the bottom of the face piece and top of the substrate are non-tacky. This is accomplished by delamination that occurs between the co-extruded layers. Such an adhesive tape however has the disadvantage that the bottom of the face piece and top of the substrate are not writable. Further, the composition of the co-extruded layers of the core laminate are limited in composition and cannot for example contain thermo-sensitive materials and components that degrade at the temperatures needed in an extrusion process.

SUMMARY OF THE INVENTION

The present invention provides an adhesive tape (10,20) for laminating a first substrate (31) to a second substrate (32), said adhesive tape comprising a carrier (13) having on a first major surface a first adhesive layer (12) and having on a second major surface opposite to said first major surface in the order given a non-tacky polymer layer (14) and a second adhesive layer (15), wherein said adhesive tape (10,20) is capable of being adhered to said first substrate (31) by said first adhesive layer (12) and to said second substrate (32) by said second adhesive layer (15), and said adhesive tape (10,20) being capable of delamination between said carrier (13) and said non-tacky polymer layer (14) when said first (31) and second substrate (32) are peeled away from each other so as to leave said carrier (13) on said first substrate (31) and said non-tacky polymer layer (14) on said second substrate (32) with a major surface of said non-tacky polymer layer (14) or said carrier (13) exposed, with the proviso that said non-tacky polymer layer (14) and carrier (13) are not co-extruded layers.

The adhesive tape of the present invention allows one substrate to be releasably adhered to another substrate. When one of the substrates is peeled from the other, the adhesive tape delaminates between the carrier 13 and the non-tacky polymer layer 14 such that the surface on both substrates is non-tacky. Moreover, both surfaces can be chosen such that one or both of them are writable. This is particularly interesting in cases where for example the insert is a mail back card that has to be completed with information from the user. Further, the composition of carrier 13 and non-tacky polymer layer 14 can be varied widely and any of carrier 13 or non-tacky polymer layer 14 can include components that are thermo-sensitive and/or that might degrade at substantially elevated temperatures normally needed in an extrusion process. Also, the adhesive tape of the present invention has the advantage that the complete process of placing inserts in a multi-page printed publication can be automated and the adhesive tape can be used by a conventional printer without the need for a specialized service.

In a particular embodiment of the present invention there is provided an adhesive tape (10,20) for laminating a first substrate (31) to a second substrate (32), said adhesive tape comprising a carrier (13) having on a first major surface a first adhesive layer (12) and having on a second major surface opposite to said first major surface in the order given a non-tacky polymer layer (14) and a second adhesive layer (15), wherein the following formula is satisfied:

$$A>C<B$$

wherein A is the force necessary to peel said first adhesive layer (12) from said carrier (13), B is the force necessary to peel said second adhesive layer (15) from said non-tacky polymer layer (14), and C is the peel force necessary to peel the non-tacky polymer layer (14) from said carrier (13) to expose a major surface of said non-tacky polymer layer (14) or said carrier (13), with the proviso that said non-tacky polymer layer (14) and carrier (13) are not co-extruded layers. As explained in more detail below, the peel force C can be adjusted by including a delamination control layer 17 between carrier 13 and the non-tacky polymer layer 14.

The present invention also provides a method for releasably adhering a first substrate (31) to a second substrate (32) using an adhesive tape as described above.

Further provided is a laminate comprising a first substrate (31) releasably adhered to a second substrate (32) by an adhesive tape (10,20) as described above.

The present invention also provides a method of manufacturing an adhesive tape (10,20).

BRIEF DESCRIPTION OF THE DRAWINGS

The invention is illustrated by means of preferred embodiments shown in the following drawings without the intention to limit the invention thereto:

FIGS. 5a and 5b are schematic drawings illustrating an embodiment for placing an insert in a multi-page printed publication using an adhesive tape of the invention.

DETAILED DESCRIPTION OF THE INVENTION AND PREFERRED EMBODIMENTS

In connection with the present invention, the meaning of "non-tacky polymer layer" is used to indicate a polymer layer that is not tacky at ambient conditions of humidity and temperature.

Figure 1:
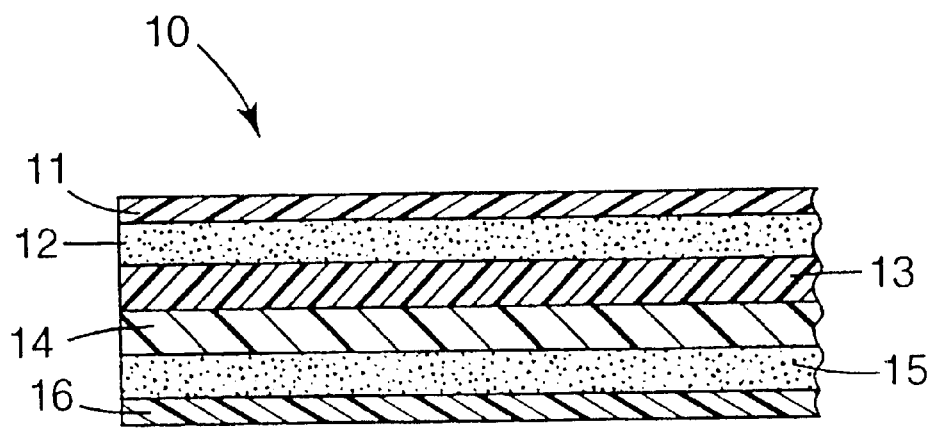
FIG. 1 is a schematic drawing of a cross-section of an adhesive tape 10 in connection with the present invention.

A first embodiment of the adhesive tape of the present invention is shown in FIG. 1. As can be seen, adhesive tape 10 comprises on one side of carrier 13 a first adhesive layer 12 and on the other side of carrier 13 a non-tacky polymer layer 14 and a second adhesive layer 15. Both adhesive layers are covered by a release liner (11,16). According to an embodiment illustrated in FIG. 4, the adhesive tape is provided as a roll wherein a release liner is provided between the adhesive layers 12 and 15. The tape of the present invention can also be provided in the form of labels.

To adhere a first substrate 31 to a second substrate 32, the release liner 11 is removed and adhesive tape 10 is adhered to first substrate 31. The release liner 16 is then removed and the first substrate 31 may then be adhered to the second substrate 32 by second adhesive layer 15 of adhesive tape 10. It will be appreciated by one skilled in the art that it is also possible to first stick adhesive tape 10 to second substrate 32 and then to first substrate 31. When the first substrate 31 is subsequently peeled from the second substrate 32, delamination will occur at the interface of carrier 13 and non-tacky polymer layer 14 (see FIG. 3b). As a consequence non-tacky polymer layer 14 remains adhered via second adhesive layer 15 to second substrate 32 and a major surface of non-tacky polymer layer 14 is exposed. Carrier 13 remains adhered to first substrate 31 by first adhesive layer 12.

The adhesive layers 12 and 15 of the adhesive tape of the present invention can be the same or different but are preferably the same. The adhesive layers 12 and 15 may include any known adhesive that permanently adheres to substrate 31 or 32 respectively. Examples include pressure sensitive adhesives, heat activated adhesives, thermosetting type adhesives and remoistenable adhesives. Particularly preferred adhesives include solution, water based and hot melt pressure sensitive adhesives. Specific pressure sensitive adhesives include acrylic based pressure sensitive adhesives, styrene-isoprene block copolymers, acrylic ester-vinyl acetate copolymers, ethylene-vinyl acetate copolymers, plasticized vinyl acetate homopolymers, rubber-latex resin emulsion systems. In the practice of preferred embodiments of the invention, the adhesive is an acrylic based adhesive.

Acrylic based adhesives are well-known in the art and are described in Satas, "Acrylic Adhesives," *Handbook of Pressure-Sensitive Adhesive Technology*. 2nd ed., pp. 396–456 (D. Satas, ed.), Van Nostrand Reinhold, New York (1989).

Suitable acrylic adhesives for use in this invention include commercially available acrylic adhesives such as the polyacrylate adhesives sold under the trademarks Duro-Tak 80-1194, 80-1196, 80-1197, 2287, 2516 and 2852 by National Starch and Chemical Corporation, Bridgewater, N.J. Other suitable acrylic adhesives are those sold under the trademarks Gelva-Multipolymer Solution GMS 737, 788, 1151 and 1430 (Monsanto; St. Louis, Mo.).

In this invention there can be used polyacrylate based adhesive including any of the homopolymers, copolymers, terpolymers, and the like of various (meth)acrylate esters. Examples of polyacrylates for use in the invention include polymers of one or more monomers of (meth)acrylic acids and other copolymerizable monomers. The polyacrylates also include copolymers of acrylate and/or methacrylate esters and/or copolymerizable monomers such as those containing functional groups in addition to an ethylenically unsaturated group. By varying the amount of each type of monomer added, the cohesive properties of the resulting polyacrylate can be changed as is known in the art. A particularly preferred polyacrylate based pressure sensitive adhesive includes an adhesive composition containing copolymers of an acrylic or methacrylic acid and an alkyl acrylate or methacrylate wherein the alkyl group has at least 4 carbon atoms, typically 4 to 10 carbon atoms. Examples of such alkyl acrylates or methacrylates include n-butyl, n-pentyl, n-hexyl, cyclohexyl, isoheptyl. n-nonyl, n-decyl, isohexyl, isobornyl, 2-ethyloctyl, isooctyl, and 2-ethylhexyl acrylates and methacrylates. Preferred alkyl acrylates include isooctyl acrylate, 2-ethylhexyl acrylate, n-butyl acrylate and cyclohexyl acrylate. A particularly preferred alkyl acrylate is isooctyl acrylate. Particularly preferred alkyl methacrylates include butyl methacrylate, cyclohexyl methacrylate, and isobornyl methacrylate.

In accordance with a highly preferred embodiment in connection with this invention, the adhesive layers 12 and 15 comprise repulpable adhesive. A preferred repulpable adhesive for use in this invention has a rating of not more than 3 in the European repulpability test described in U.S. Pat. No. 5,380,779. Examples of repulpable adhesive for use in the invention include the repulpable adhesives disclosed in U.S. Pat. Nos. 5.380,779, 4,413,080, 4,569,960, 4,482,675, 4,992,501, 4,388,432, 5,102,733 and 5,125,995. The thickness of the adhesive layers 12 or 15 can be varied widely but is typically between 1$\mu$m and 100$\mu$m and preferably between 10$\mu$m and 40$\mu$m.

The carrier 13 can be any material commonly used for tapes and includes paper as well as plastic film. Examples of carriers include polyethylene film, polypropylene film, polyester film, polyethylene or polypropylene coated paper, transparent paper such as the transparent papers commercially available from Canson (France) and non-woven materials. In case paper is used as the carrier 13, it is preferred to use a smooth paper of low porosity. The thickness of carrier 13 is typically between 30$\mu$m and 250$\mu$m and preferably between 40$\mu$m and 70$\mu$m.

Examples of polymers for use in the non-tacky polymer layer 14 of an adhesive tape of this invention include polyvinyl chlorides, polyvinylidene chlorides, polyvinyl alcohols such as Mowiol™ 4/88 available from Clariant A.G., polyvinylacetates, polyvinyl pyrrolidones and copolymers of vinylchloride and vinylacetate such as UCAR™ vinyl VYES and UCAR™ vinyl VMCA both commercially available from Union Carbide. The non-tacky polymer layer 14 may contain additives in addition to the polymer. For example, the non-tacky polymer layer 14 may additionally contain wetting agents, thermo-sensitive compounds such as thermo-sensitive dyes, defoamers, plasticizers and fungicides. A particularly preferred non-tacky polymer layer 14 contains a repulpable polymer such as polyvinylalcohol. A non-tacky polymer layer 14 containing a polyvinylalcohol preferably also contains a plasticizer or combination of plasticizers. Particularly preferred plasticizers for use in a polyvinyl alcohol based non-tacky polymer layer includes a combination of a polyol such as diethylene glycol and a hydroxy modified rubber such as Kraton™ L 1803 available from Shell. The thickness of the non-tacky polymer layer 14 is preferably between 1$\mu$m and 40$\mu$m and more preferably between 10$\mu$m and 15$\mu$m. According to a particular embodiment of the present invention, encapsulated fragrances can be included in the non-tacky polymer layer 14. Details about encapsulated fragrance and their preparation can be found in an article entitled "Encapsulation of fragrances" of Dr.

Howard J. Buttery, in Cosmetics and Toiletries Manufacture Worldwide. Encapsulated fragrances are also commercially available from 3M under the brand 3M Dry Perfume. Including encapsulated fragrances can provide an advantage in case the insert is a sample of a fragrance. Removing such a sample from the magazine page by a user will cause rupture of the capsules containing the fragrance, thus releasing the fragrance so that the user immediately gets an impression of the perfume without having to open the sample.

Furthermore, encapsulated fragrance may bring a pleasant dimension to advertisement inserted in the magazine.

Figure 4:
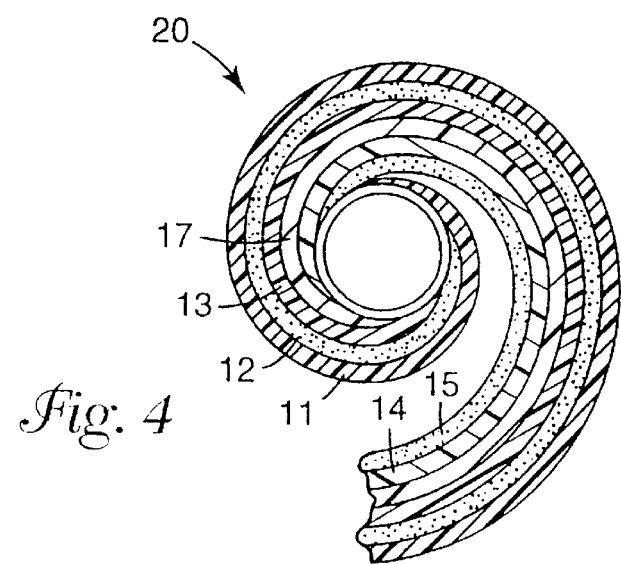
FIG. 4 is a schematic drawing of an adhesive tape in the form of a roll.

The release liners 11 and 16 can be selected from a number of known and available papers having a release material coated onto one side of the paper web or on both sides in case of an adhesive tape in the form of a roll as shown in FIG. 4. The base paper of the release liner may be selected from krafts, super-calendered krafts, clay coated krafts, glassines, parchments, and other papers and films which have a suitable undercoating for release coating hold-out. The release coating may be any of the known materials used for their release properties for adhesives. Preferred types are silicones and modified silicones, the modification including both copolymerization of silicones with other non-release chemical agents or by adding non-silicone materials to the silicone coating solution prior to application to the release base paper. Other release agents such as polyethylene, fluorocarbons, the Werner-type chromium complexes, and polyvinyl octadecyl carbamate may also be used. The choice of release coating is dependent on the tack, adhesion level, and chemical nature of the adhesive layer 12 or 15. The release liners 11 and 16 are chosen such that when they are removed from the adhesive tape no premature delamination takes place between the carrier 13 and the non-tacky polymer layer 14.

Delamination at the interface between carrier 13 and non-tacky polymer layer 14 is typically accomplished by designing the adhesive tape such that the following equation is satisfied:

$$A > C < B$$

wherein A is the force necessary to peel the first adhesive layer 12 from the carrier 13. B is the force necessary to peel the second adhesive layer 15 from the non-tacky polymer layer 14, and C is the peel force necessary to peel the non-tacky polymer layer 14 from carrier 13 to expose a major surface of the non-tacky polymer layer 14. If needed, the peel force C can be adjusted by including a delamination control layer 17 between carrier 13 and non-tacky polymer layer 14.

The peel force will typically be between 0.1 N/cm and 0.25 N/cm when measured under a peel angle of 90° and at a rate of 300 mm/min. The peel forces A and B typically have a value which is at least twice the value of the peel force C and preferably at least 5 times and more preferably at least 10 times the value of the peel force C.

Figure 2:
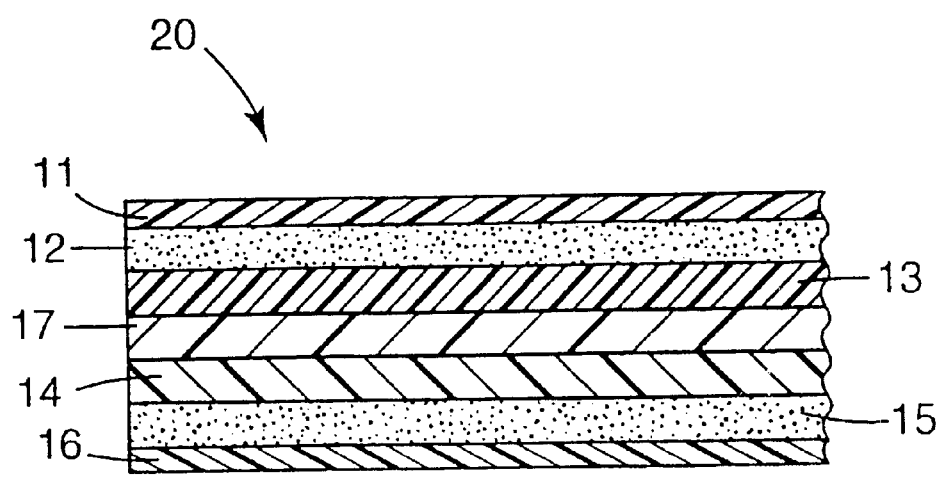
FIG. 2 is a schematic drawing of a cross-section of an adhesive tape 20 in connection with the present invention.
Figure 3A:
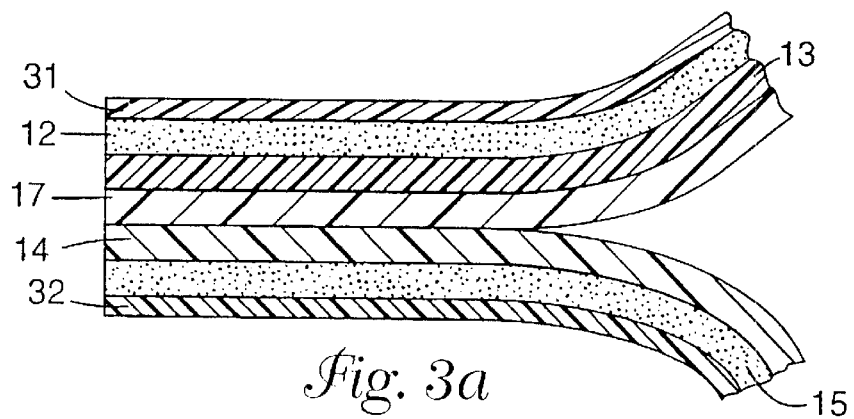
FIGS. 3a and 3b are schematic drawings to illustrate the method of peeling substrate 31 from substrate 32.
Figure 3B:
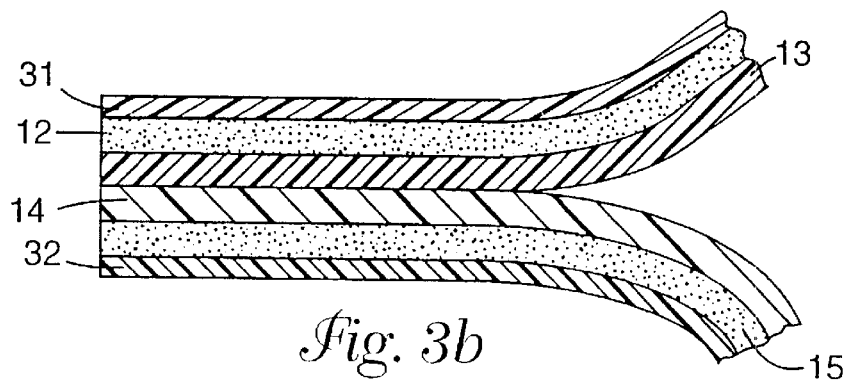

Thus, in accordance with a particularly preferred embodiment in connection with the present invention there is provided adhesive tape 20 which includes a delamination control layer 17 between carrier 13 and non-tacky polymer layer 14 as shown in FIG. 2. Delamination control layer 17 is a layer that can be placed between the carrier 13 and non-tacky polymer layer 14 to control the delamination of the adhesive tape. Thus, delamination control layer 17 can be chosen to adjust the force necessary to cause delamination between carrier 13 and non-tacky polymer layer 14 relative to the force necessary to cause delamination of the adhesive layers. Delamination control layer 17 can be chosen to either increase or decrease the force necessary to cause delamination between carrier 13 and non-tacky polymer layer 14. Delamination control layer 17 is typically a layer that adheres stronger to carrier 13 than it adheres to non-tacky polymer layer 14 and can be used to facilitate delamination of the tape between carrier 13 and non-tacky polymer layer 14. Delamination control layer 17 should also be non-tacky. Accordingly, as shown in FIG. 3a, the adhesive tape 20 will delaminate at the interface between non-tacky polymer layer 14 and delamination control layer 17.

A delamination control layer 17 for decreasing the delamination force, typically includes a release material such as silicone or fluorine containing material. Particularly suitable materials are silicone containing materials. By varying the amount of silicone in the delamination control layer 17, the delamination force can be adjusted as desired. A particularly desirable release material for delamination control layer 17 is an aqueous emulsion of silicone latex, available from Rhone-Poulenc as Silicolease® emulsion system, further containing a hydrophilic binder such as hydroxyethyl cellulose. Still further materials for use in delamination control layer 17 include the release materials described in EP-A0618509, U.S. Pat. No. 5,202,190 and U.S. Pat. No. 5,032,460. A delamination control layer 17 for decreasing the delamination force (peel force C) is highly preferred in case carrier 13 comprises paper.

The delamination force may also be adjusted by providing the delamination control layer 17 discontinuous. For example, a silicone release material typically used to produce a release liner, may be applied by flexographic printing to the carrier 13 such that only about 90 to 95% of the carrier's surface is covered by the release material. As a result, the force to delaminate non-tacky layer 14 from the carrier 13 will be low at places where the release material covers the surface of carrier 13 and will be high at places where the surface of carrier 13 is not covered by the release material so that non-tacky layer 14 may be in contact with carrier 13 at such places. Since the force necessary to cause delamination between carrier 13 and non-tacky polymer layer 14 is the average of the force at a place where release material covers the surface of carrier 13 and where it does not cover the surface of carrier 13, the delamination force can be adjusted by varying the amount of surface of carrier 13 covered by the release material of delamination control layer 17. According to a still further embodiment of the present invention, a polyurethane layer can be used as the delamination control layer 17. The latter offers the advantage that after delamination, the surface of carrier 13 containing the delamination control layer 17 will be writable.

In case the carrier is of plastic, it may be desirable to increase the force necessary to cause delamination between carrier 13 and non-tacky polymer layer 14 by means of delamination control layer 17 because in that case, the delamination force may be so small that delamination could occur during handling. Alternatively, the surface of carrier 13 may be given a corona treatment to increase the delamination force.

Further, in accordance with the present invention, it is highly preferred that the adhesive tape 10,20 is transparent. Therefore, it is preferred to use a transparent carrier 13, such as a plastic film or transparent paper, and transparent layers 12, 14, 15 and 17. It will further be appreciated by one skilled in the art, that the adhesive tape of the invention can contain additional layers than those described above such as primer-layers provided on one or both sides of the carrier. According to a particular preferred embodiment, adhesive tape 10,20 is repulpable. A repulpable adhesive tape 10,20 can be obtained by selecting a repulpable carrier such as paper and by selecting repulpable compositions for the adhesive layers (12,15), non-tacky polymer layer 14 and delamination control layer 17 when present.

In accordance with this invention, a method of manufacturing an adhesive tape (10,20) for releasably adhering a first substrate (31) to a second substrate (32) comprises the steps of:

(a) providing a carrier (13);
(b) applying a non-tacky polymer layer (14) to a first major surface of said carrier (13);
(c) applying an adhesive layer (15) to said non-tacky polymer layer and
(d) applying an adhesive layer (12) to a second major surface of said carrier (13) opposite to said first major surface of said carrier (13), wherein said step (b) is carried out subsequent to step (a) and said adhesive tape (10,20) is capable of delamination between said carrier (13) and said non-tacky polymer layer (14) when said first (31) and second substrate (32) are peeled away from each other so as to leave said carrier (13) on said first substrate (31) and said non-tacky polymer layer (14) on said second substrate (32) with a major surface of said non-tacky polymer layer (14) or carrier (13) exposed.

The above method may further comprise the step of applying a delamination control layer 17 to carrier 13 if such layer is desirable. Preferably, non-tacky polymer layer 14 and optional delamination control layer 17 are applied from a coating solution comprising the components of the layer dissolved or dispersed in a solvent. The solvent can be an organic solvent or water or mixtures of water and an organic solvent. The adhesive layers can be applied by any known adhesive coating technique or they can be applied by lamination.

For example the adhesive tape 20 including paper, e.g. transparent paper, as carrier 13 may be coated on the first major surface with a delamination control layer 17. Such coating may be applied by well known coating techniques such as die coating or gravure coating. The second major surface of the paper may be coated with a primer layer. On the delamination control layer 17 is then coated the non-tacky polymer layer 14. This may for example be accomplished by hopper coating or any other coating technique known in the art. The second major surface of the paper, which has optionally been provided with a primer layer, is coated with the adhesive layer 12 and a release liner 11 is then provided on the adhesive layer 12. Alternatively, a release liner 11 provided with adhesive layer 12 may be laminated to the second major surface of the paper. Finally, a liner 16 provided with adhesive layer 15 is laminated to the non-tacky layer 14 to produce an adhesive tape 20.

According to a further embodiment, adhesive tape 20 may be produced by coating a first major surface of carrier 13, for example paper, with a delamination control layer 17 and non-tacky polymer layer 14 as described above. Liner 11 coated with adhesive 12 may then be laminated to the non-tacky polymer layer 14. The second major surface of carrier 13 can be coated with adhesive layer 15 and the adhesive tape thus produced can be wound such that the release liner forms the outer circumference of the roll as shown in FIG. 4. As an alternative to this method of producing a roll of adhesive tape, the adhesive layer 15 may also be applied by lamination.

The adhesive tape of the present invention can be used to releasably adhere any of two substrates to one another. Examples of substrates 31 and 32 include paper, cardboard, plastic film, textile, metal and glass. The present invention is however particularly suitable for adhering inserts to a page of a multi-page printed publications. Examples of inserts include mail back cards, plastic cards and product samples such as samples of perfume packaged in plastic or aluminized bag.

FIG. 5 illustrates an embodiment for automatically placing inserts in a newspaper, magazine or other multi-page printed publication. As shown in FIG. 5a, the pages 103 of a multi-page printed publication are transported in an overlapping configuration by a conveyor 100. By means of for example a label applicator 101, adhesive tape 10 in the form of a label may be applied to a desired page 105 and release liners 11 and/or 16 are removed from adhesive tape 10 such that the adhesive tape is adhered to desired page 105 by adhesive layer 12 or 15 and the other adhesive layer is exposed. The conveyor is transported in the direction of the arrow shown in FIG. 6a so that desired page 105 is transported under insert applicator 102. Once desired page 105 is properly positioned with adhesive tape 10 under the insert applicator 102, the latter applies the insert (see FIG. 5b) which is thereby adhered via adhesive layer 15 or 12 respectively to the desired page 105. Proper positioning may either be detected or may be accomplished by synchronisation of 20 the speed of the conveyor with the speed of application of inserts from applicator 102. The pages of the multi-page printed publication, including desired page 105 with the insert thereon, may then be further transported and further processed to form the multi-page printed publication.

EXAMPLES

The following examples are provided to illustrate the invention in more detail without however limiting the invention thereto. In the examples all parts, ratios, percentages are by weight unless otherwise noted.

Example 1

The following coating solutions were prepared:

Coating solution for the delamination control layer (coating solution 1-A) 33 parts of polyvinylalcohol modified with 67 parts of octadecyl isocyanate were dissolved in toluene in an amount of 6.7%.

Coating solution for the non-tacky polymer layer (coating solution 1-B)

An aqueous solution containing the following components was prepared:

| | |
|---|---|
| Polyvinylalcohol (Mowiol ™ 4–88, available from Clariant) | 94.5% |
| diethylene glycol | 5% |
| p-hydroxymethylbenzoate | 0.3% |
| p-hydroxypropylbenzoate | 0.1% |
| Surfynol ™ 336 (available from Air Products) | 0.1% |

Coating solution for the adhesive layers (coating solution 1-C) A 40% solids solution in a 1:1 mixture of ethylacetate and methanol was prepared containing 100 parts of acrylic copolymer of butylacrylate and acrylic acid (75/25), 75 parts of a hydrogenated rosin acid tackifier, 70 parts of mono-fenyl ether of tetraethylene glycol as a plasticizer and 65 parts of N-methyldiethanolamine as a neutralizing agent.

Preparation of the adhesive tape:

Silcote 6625 paper (57 g m$^2$) available from Ahlstrom Paper Group was used as the carrier 13. Silcote 6625 is a smooth paper that has been provided on one side (hereinafter A-side) with a barrier coating containing a latex polymer, silicates and starch. The opposite side of the paper was uncoated (B-side)

The A-side of the paper was coated with coating solution 1-A using Meyer bar coating with a 35$\mu$m wire and parallel bar speed. The coating was dried and the obtained dry coating thickness was about 2–3$\mu$m.

To this layer was then coated the coating solution 1-B using a nip feed coater with a feed gap of 40$\mu$m. The coating was dried at an elevated temperature and the obtained dry coating thickness was about 8–13$\mu$m. A coated paper sample A was thus obtained.

Separately, there was coated the coating solution 1-C to a siliconized release liner using nip feed coating with a 100$\mu$m gap. After drying, a coating thickness of about 35$\mu$m was obtained.

Thus obtained adhesive coated release liner was laminated with the adhesive layer on the coated side (side A) of the coated paper sample A. At the opposite side of the paper sample (side B), was provided an adhesive layer by transferring the adhesive layer from the above prepared adhesive coated release liner to the paper. A thus obtained adhesive tape was wound to a roll as shown in FIG. 4.

A piece of a thus prepared adhesive tape was adhered with the adhesive layer on the B-side of the paper on a magazine page. The release liner on side A of the paper was then removed and a cardboard was adhered with the exposed adhesive layer to the magazine page. The cardboard did not release from the magazine page during normal handling of the magazine and could be removed easily by rapidly peeling the cardboard. No damage to the magazine page occurred and both the page and cardboard were non-tacky.

Example 2

To a transparent paper available from Canson (70 g/m$^2$) was coated a polyurethane release coat obtained from Ichemco (Italy) to a wet coating thickness of 40$\mu$m using a doctor blade. After drying, a thickness of about 5$\mu$m was obtained. To this polyurethane coating was then coated coating solution 1-B (described in example 1) at a wet coating thickness of 40$\mu$m using a doctor blade. After drying, a thickness of about 8–11$\mu$m was obtained. To this coating was then provided an adhesive coating solution of 25% solids containing a copolymer of iso-octylacrylate and acrylic acid (95/5) tackified with 10% of a rosin ester (Foral™ 85, available from Hercules) relative to the copolymer. The adhesive coating was coated by a doctor blade at a wet coating thickness of 100$\mu$m. The same adhesive coating was also coated to the other side of the transparent paper at a wet coating thickness of 100$\mu$m and both adhesive layers were protected with a release liner.

The thus obtained adhesive tape could be used to adhere a cardboard to a magazine page. By rapid peeling the cardboard could be removed from the magazine page without causing damage thereto and both the magazine page and cardboard surfaces were non-tacky.

Examples 3 to 10

These examples illustrate that the delamination between the carrier and the non-tacky polymer layer can be varied by modifying the chemical composition of the delamination control layer.

A paper (ADERCOTE™ Gerfast 80 g/m² available from Ahlstrom Paper Group) coated on one side with a latex polymer (A-side) and uncoated on the other side (B-side) was provided. Samples 3 to 11 were prepared by coating to the A-side of the paper a silicone release coating as shown in table 1 using doctor blade coating without a shim. A very thin coating was thus obtained. To this silicone release coating were then coated the coating solution 1-B of example 1 at a dry thickness of 8–12μm and the adhesive coating solution 1-C of example 1 at a dry thickness of 38–45μm. The adhesive layer was protected with a release liner. At the opposite side (B-side) of the paper was coated with the adhesive coating solution 1-C at a dry thickness of 38–45μm and the adhesive layer was also protected with a release liner.

|       | Example no[1] | | | | | | | |
|-------|------|------|------|------|------|------|------|------|
| Comp.[2] | 3 | 4 | 5 | 6 | 7 | 8 | 9 | 10 |
| A700  | 40 | 40 | 40 | 40 | 40 | 40 | 40 | 40 |
| 71822 | 0.16 | 0.32 | 0.48 | 0.64 | 0.8 | 0.96 | 1.12 | 1.28 |
| 71823 | 0.016 | 0.032 | 0.048 | 0.064 | 0.08 | 0.096 | 0.112 | 0.128 |
| 71806 | 0.0064 | 0.0128 | 0.0192 | 0.0256 | 0.032 | 0.0384 | 0.0448 | 0.0512 | notes:
[1] the amounts of the components of the coating solution is in grams.
[2] A700 is a solution of a silicone latex in water (40% solids) (Silicolease ™ A700 available from Rhône-Poulenc); 71822 is a solution of a silicone polymer in water (41.5% solids) (Silicolease ™ 71822 available from Rhône-Poulenc); 71823 is a solution of a catalyst in water (40.9% solids) (Silicolease ™ 71823 available from Rhône-Poulenc) and 71806 is a solution of crosslinker in water (57% solids) (Silicolease ™ 71806 available from Rhône-Poulenc).

Each of the adhesive tapes 3 to 10 obtained was used to adhere a cardboard to a magazine page. It was observed that with the adhesive tapes of examples 3 to 5, damage to the magazine page sometimes occurred when removing the cardboard and with the adhesive tapes of examples 8 to 10, the cardboard sometimes released from the magazine page upon handling. Examples 6 and 7 provided the best results.

Example 11

On a polyester film having a thickness of 70μm was coated the coating solution 1-B of example 1 using doctor blade coating to a wet thickness of 30μm. To this coating and to the opposite side of the polyester film was then provided the adhesive coating described in example 2 to a wet coating thickness of about 70μm using a doctor blade. Both adhesive layers were protected by a liner.

The thus obtained adhesive tape could be used to releasably adhere an article to a magazine page.

Example 12

An adhesive tape was prepared as in example 11 but with the exception that instead of the coating solution 1-B, a 30% solution in methylethyl ketone of a copolymer vinylchloride and vinylacetate (UCAR™ vinyl VYES available from Union Carbide) was used. The thus obtained adhesive tape could be used to releasably adhere an article to a magazine page.

What is claimed is:

1. An adhesive tape for laminating a first substrate to a second substrate, said adhesive tape comprising:
   a carrier;
   a first adhesive layer on a first major surface of the carrier;
   a solution-coated, non-tacky polymer layer on a second major surface of the carrier, wherein said non-tacky polymer layer comprises a polymer selected from the group consisting of polyvinyl alcohols, polyvinyl chlorides, polyvinylidene chlorides, polyvinyl acetates, polyvinyl pyrrolidones, and copolymers of vinyl acetate and vinyl chloride;
   a second adhesive layer on a major surface of the non-tacky polymer layer opposite the carrier; and
   at least one release liner on the first adhesive layer, the second adhesive layer, or both the first and second adhesive layers;
   wherein said adhesive tape satisfies the following formula:

$$A > C < B$$

wherein A is the force necessary to peel said first adhesive layer from said carrier, B is the force necessary to peel said second adhesive layer from said non-tacky polymer layer, and C is the peel force necessary to peel the non-tacky polymer layer from said carrier.

2. An adhesive tape according to claim 1 wherein a first release liner is provided on said first adhesive layer and a second release liner is provided on said second adhesive layer.

3. An adhesive tape according to claim 1 wherein said adhesive tape is in the form of a roll and a single release liner is provided between said first and second adhesive layers.

4. An adhesive tape according to claim 1 wherein said carrier is a plastic film or paper.

5. An adhesive tape according to claim 1 wherein said adhesive tape is transparent.

6. An adhesive tape according to claim 1 wherein said carrier is paper and said adhesive tape is repulpable.

7. An adhesive tape according to claim 1 wherein said carrier is paper.

8. An adhesive tape according to claim 1 wherein the adhesive tape contains a delamination control layer, and said delamination control layer is a polyurethane layer.

9. An adhesive tape according to claim 1 wherein the adhesive tape contains a delamination control layer, and said delamination control layer is discontinuous.

10. An adhesive tape according to claim 1 wherein the non-tacky polymer layer contains thermo-sensitive or extrusion-degradable materials.

11. An adhesive tape according to claim 1 wherein the non-tacky polymer layer contains encapsulated fragrances.

12. An adhesive tape according to claim 1 wherein at least one of the carrier and the non-tacky polymer layer is writable.

13. An adhesive tape according to claim 1 wherein both the carrier and the non-tacky polymer layer are writable.

14. A roll of adhesive tape, wherein the roll comprises the adhesive tape according to claim 1, wherein the adhesive tape contains a single release liner separating the first and second adhesive layers.

15. An adhesive tape according to claim 1 wherein a delamination control layer is provided between said carrier and said non-tacky polymer layer.

16. An adhesive tape according to claim 15 wherein said delamination control layer comprises a polysiloxane or a fluorinated polymer.

17. An adhesive tape for laminating a first substrate to a second substrate, said adhesive tape comprising:
   a carrier;
   a first adhesive layer on a first major surface of the carrier;
   a solution coated, non-tacky polymer layer on a second major surface of the carrier, wherein the non-tacky polymer layer consists of (i) a polymer selected from the group consisting of polyvinyl chloride, polyvinylidene chloride, polyvinyl alcohol, polyvinylacetate, polyvinyl pyrrolidone, and copolymers of vinylchloride and vinylacetate; and (ii) optional additives selected from the group consisting of a wetting agent, a thermo-sensitive dye, a defoamer, a plasticizer, a fungicide, diethylene glycol, a hydroxy modified rubber, an encapsulated fragrance, or a combination thereof;
   a second adhesive layer on a major surface of the non-tacky polymer layer opposite the carrier; and
   at least one release liner on the first adhesive layer, the second adhesive layer, or both the first and second adhesive layers;
wherein the adhesive tape satisfies the following formula:

$$A > C < B$$

wherein A is the force necessary to peel said first adhesive layer from said carrier, B is the force necessary to peel said second adhesive layer from said non-tacky polymer layer, and C is the peel force necessary to peel the non-tacky polymer layer from said carrier.

18. An adhesive tape according to claim 17 wherein the non-tacky polymer layer contains encapsulated fragrances.

19. An adhesive tape according to claim 17 wherein at least one of the carrier and the non-tacky polymer layer is writable.

20. An adhesive tape according to claim 17 wherein both the carrier and the non-tacky polymer layer are writable.

21. An adhesive tape according to claim 17 wherein said carrier is paper; the non-tacky polymer layer comprises repulpable polyvinyl alcohol; and the first and second adhesive layers comprise repulpable adhesive.

22. An adhesive tape according to claim 17 further comprising a delamination control layer positioned between the carrier and the non-tacky polymer layer and adhered to the carrier.

23. An adhesive tape according to claim 22 wherein the delamination control layer is a polyurethane layer.

24. An adhesive tape according to claim 22 wherein the delamination control layer is discontinuous.

25. An adhesive tape according to claim 17 wherein said carrier is paper.

26. An adhesive tape according to claim 25 wherein the non-tacky polymer layer consists of (i) repulpable polyvinyl alcohol; and (ii) optional additives selected from the group consisting of a wetting agent, a thermo-sensitive dye, a defoamer, a plasticizer, a fungicide, diethylene glycol, a hydroxy modified rubber, an encapsulated fragrance, or a combination thereof.

27. A roll of adhesive tape consisting of:
   a carrier;
   a first adhesive layer on a first major surface of the carrier;
   a solution-coated, non-tacky polymer layer on a second major surface of the carrier;
   a second adhesive layer on a major surface of the non-tacky polymer layer opposite the carrier;
   an optional delamination control layer positioned between the carrier and the non-tacky polymer layer; and
   a single release liner separating the first adhesive layer from the second adhesive layer;
wherein said roll of adhesive tape satisfies the following formula:

$$A > C < B$$

wherein A is the force necessary to peel said first adhesive layer from said carrier, B is the force necessary to peel said second adhesive layer from said non-tacky polymer layer, and C is the peel force necessary to peel the non-tacky polymer layer from said carrier.

28. A roll of adhesive tape according to claim 27 wherein the non-tacky polymer layer consists of (i) a polymer selected from the group consisting of polyvinyl chloride, polyvinylidene chloride, polyvinyl alcohol, polyvinylacetate, polyvinyl pyrrolidone, and copolymers of vinylchloride and vinylacetate; and (ii) optional additives selected from the group consisting of a wetting agent, a thermo-sensitive dye, a defoamer, a plasticizer, a fungicide, diethylene glycol, a hydroxy modified rubber, an encapsulated fragrance, or a combination thereof.

29. An adhesive tape for laminating a first substrate to a second substrate, said adhesive tape consisting of:
   a carrier;
   a first adhesive layer on a first major surface of the carrier;
   a solution-coated, non-tacky polymer layer on a second major surface of the carrier;
   a second adhesive layer on a major surface of the non-tacky polymer layer opposite the carrier;
   an optional delamination control layer positioned between the carrier and the solution-coated, non-tacky polymer layer; and
   at least one release liner on the first adhesive layer, the second adhesive layer, or both the first and second adhesive layers;
wherein said adhesive tape satisfies the following formula:

$$A > C < B$$

wherein A is the force necessary to peel said first adhesive layer from said carrier, B is the force necessary to peel said second adhesive layer from said non-tacky polymer layer, and C is the peel force necessary to peel the non-tacky polymer layer from said carrier.

30. An adhesive tape according to claim 29 wherein the non-tacky polymer layer comprises a polymer selected from the group consisting of polyvinyl alcohols, polyvinyl chlorides, polyvinylidene chlorides, polyvinyl acetates, polyvinyl pyrrolidones, and copolymers of vinyl acetate and vinyl chloride.

31. An adhesive tape according to claim 29 wherein the non-tacky polymer layer consists of (i) a polymer selected from the group consisting of polyvinyl chloride, polyvinylidene chloride, polyvinyl alcohol, polyvinylacetate, polyvinyl pyrrolidone, and copolymers of vinylchloride and vinylacetate; and (ii) optional additives selected from the group consisting of a wetting agent, a thermo-sensitive dye, a defoamer, a plasticizer, a fungicide, diethylene glycol, a hydroxy modified rubber, an encapsulated fragrance, or a combination thereof.

32. A method of manufacturing an adhesive tape for releasably adhering a first substrate to a second substrate comprising the steps of:

(a) providing a carrier;

(b) solution coating a non-tacky polymer layer onto a first major surface of said carrier;

(c) applying an adhesive layer to said non-tacky polymer layer and (d) applying an adhesive layer to a second major surface of said carrier opposite to said first major surface of said carrier, wherein said step (b) is carried out subsequent to step (a) and said adhesive tape satisfies the following formula:

$$A > C < B$$

wherein A is the force necessary to peel said adhesive layer from said carrier, B is the force necessary to peel said adhesive layer from said non-tacky polymer layer, and C is the peel force necessary to peel the non-tacky polymer layer from said carrier.

33. A method according to claim 32 wherein said method further comprises the step of applying on said carrier a delamination control layer.

34. A method according to claim 32 wherein the step of solution coating comprises:

applying onto the first major surface of said carrier a non-tacky polymer selected from the group consisting of polyvinyl alcohols, polyvinyl chlorides, polyvinylidene chlorides, polyvinyl acetates, polyvinyl pyrrolidones, and copolymers of vinyl acetate and vinyl chloride.

35. A method according to claim 32 wherein the step of solution coating comprises:

applying onto the first major surface of said carrier a solution consisting of:

(i) a polymer selected from the group consisting of polyvinyl chloride, polyvinylidene chloride, polyvinyl alcohol, polyvinylacetate, polyvinyl pyrrolidone, and copolymers of vinylchloride and vinylacetate; and (ii) optional additives selected from the group consisting of a wetting agent, a thermo-sensitive dye, a defoamer, a plasticizer, a fungicide, diethylene glycol, a hydroxy modified rubber, an encapsulated fragrance, or a combination thereof.

* * * * *

UNITED STATES PATENT AND TRADEMARK OFFICE
CERTIFICATE OF CORRECTION

PATENT NO. : 6,740,379 B1
DATED : May 15, 2004
INVENTOR(S) : Congard, Pierre M.

It is certified that error appears in the above-identified patent and that said Letters Patent is hereby corrected as shown below:

Title page,
Item [56], References Cited, U.S. PATENT DOCUMENTS, delete "Zawadzki" and insert -- Zawadski --.
OTHER PUBLICATIONS, delete "Cosmetics and Toiletries Manufacture Worldwide, 1994.*".

Column 4,
Line 52, after "*Technology*" delete "." and insert -- , --.

Column 5,
Line 14, after "isoheptyl" delete "." and insert -- , --.

Column 6,
Lines 3-4, there should not be a new paragraph starting with "Howard J. Buttery,".
Line 47, after "13" delete "." and insert -- , --.

Column 8,
Lines 31-38, insert a new paragraph starting with "Preferably, non-tacky polymer ...".

Column 9,
Line 27, delete "synchronization" and insert -- synchronization --.
Line 28, delete "20" before "the speed".
Lines 43, 47 and 60, insert -- - -- (a dash) before "Coating".

Column 10,
Line 2, delete "(57 gm$^2$)" and insert -- (57 g/m$^2$) --.

Signed and Sealed this

Twenty-eighth Day of December, 2004

JON W. DUDAS
*Director of the United States Patent and Trademark Office*